Aug. 17, 1943.     D. E. WOBBE     2,326,814
METHOD OF PREPARING BLACK PLATE FOR CAN MANUFACTURE
Filed Nov. 28, 1939     2 Sheets-Sheet 1
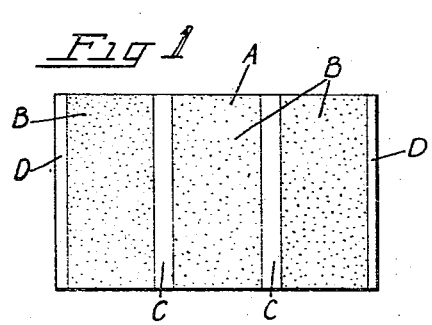
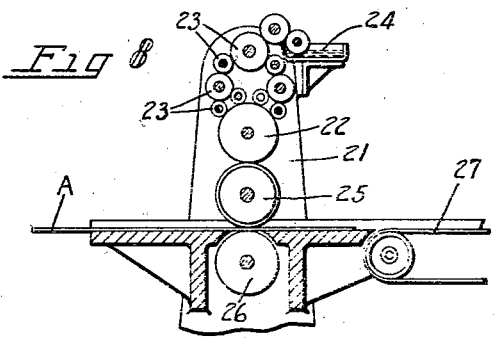
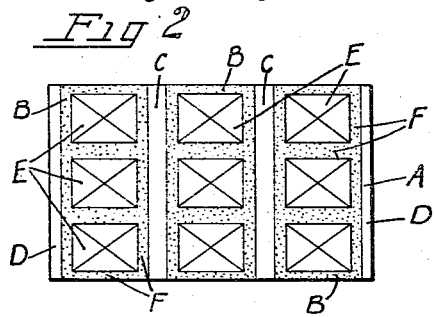
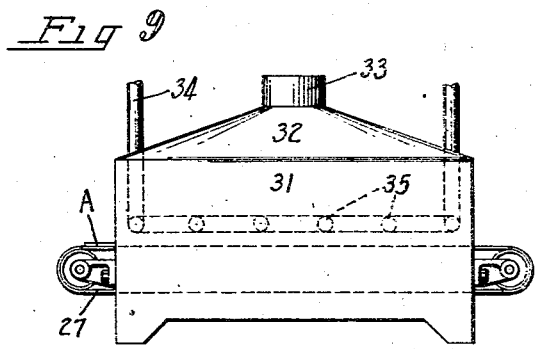
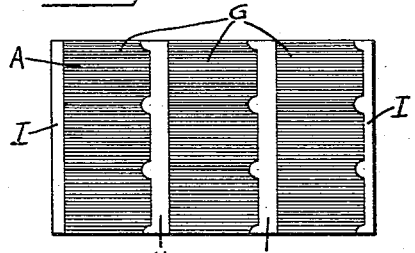
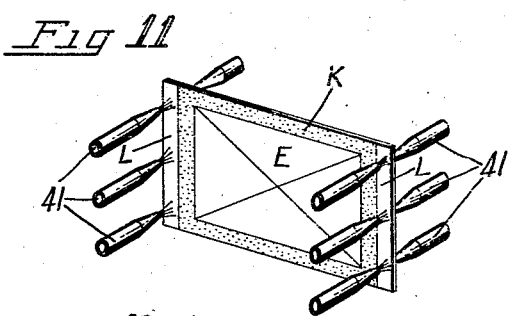
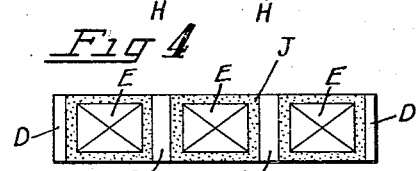
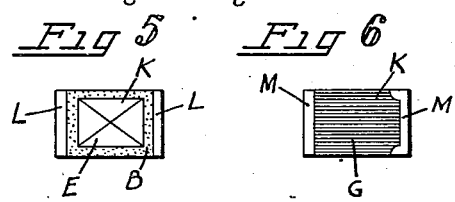
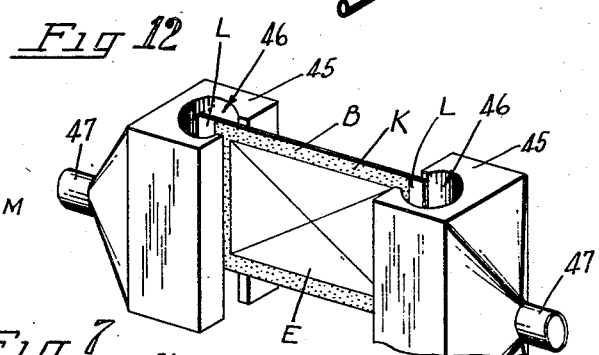
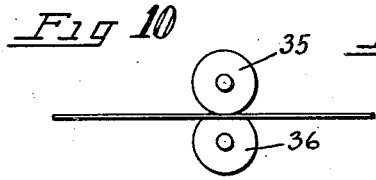
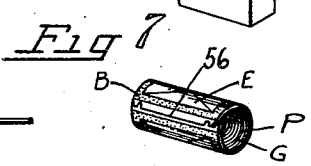
INVENTOR
Delbert E. Wobbe.
BY
ATTORNEYS

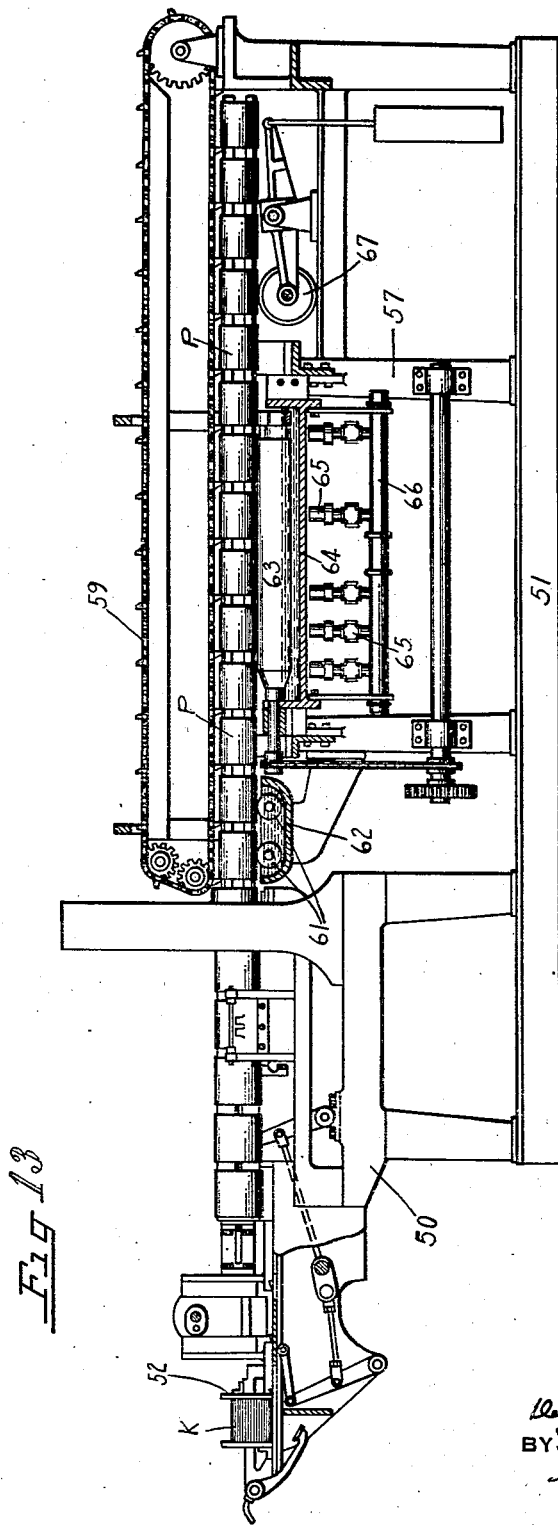

Patented Aug. 17, 1943

2,326,814

UNITED STATES PATENT OFFICE 2,326,814

METHOD OF PREPARING BLACK PLATE FOR CAN MANUFACTURE

Delbert E. Wobbe, River Forest, Ill., assignor to American Can Company, New York, N. Y., a corporation of New Jersey Application November 28, 1939, Serial No. 306,574

3 Claims. (Cl. 113—120)

The present invention relates to the treatment of black iron sheet metal, called black plate, and has particular reference to process steps directed to preparing such material for can manufacture or similar purposes wherein joints or seams are produced and wherein the seam sections are deoxidized preparatory to sealing of the seam.

In can manufacture, sheets or strips of steel or iron, usually referred to as black plate, are coated with tin to produce the well known commercial tinplate so widely used in the manufacture of tin cans. Other metallic coatings such as lead, zinc, copper or mixtures of these metals may also be used. A coating, for example, which is largely of lead forms what is known as terne plate.

Cans made from tinplate, for example, are first blanked out and the blanks are formed into tubular shape, edges of the blank being joined in a side seam to produce the tubular can body. Such a side seam may include an overlapping of the blank edges and these edges may be held together by solder or the overlapped parts may be welded. In other cases the side seam may be produced by an interlocking or interhooking of the blank edges.

Where the product to be put in the can is a liquid or where a hermetically sealed can is desired, the interlocked edges may also be soldered or welded. In this manufacture of tin coated articles the tin coating of the plate is primarily used to protect the surface of the black plate against rust and other deterioration. However, the tin coating also provides a surface which can be properly soldered or welded.

The use of the plain black plate has been suggested as a cheaper substitute for tinplate, terne plate, etc., in the manufacture of cans for some products. However, a difficulty immediately presents itself. It becomes apparent that the oxide surface of the black plate cannot be either soldered or welded.

The present invention is directed to the treatment of black plate as a step in the preparation of a can body from such material so that the body may be made into a can having a properly soldered or welded side seam. Such treatment also contemplates protection of one or both surfaces of the can by suitable paints or lacquers or other coating material.

According to the present invention sections of the can body blank which are to enter into the side seam of a can made from a black plate blank are not coated on either side and these seam sections oxidize in the regular way. The present invention, therefore, provides an efficient method step of deoxidizing such seam sections so that soldering or welding can be carried out in the usual way and the can formed from the body can be a hermetically sealed can where this is desirable.

An object of the present invention is the provision of a method of making can bodies from black plate which may be soldered or welded and which provides protection against deterioration by oxidization or otherwise of the can surfaces.

Another object of the invention is the provision of such a method wherein parts of the black plate which enter into the side seam of the can made therefrom are cleaned or deoxidized prior to completing the seam.

A further object is the provision of a method of treating a sheet of black plate for the production of a can body blank and defining side seam sections in the blank by a protective coating applied to one or both surfaces and subsequently clearing or deoxidizing such seams sections preparatory to forming the can body and its side seam so that such side seam may be properly soldered or welded.

Yet another object is the provision of suitable steps in a method of manufacture of can bodies made from black plate which first includes coating a sheet of the plate with protective coating material applied in a pattern to leave uncoated certain sections, deoxidizing such uncoated sections to provide areas to be incorporated in the side seams of the can bodies produced therefrom, cutting the sheet into individual can body blanks, forming into can bodies having side seams and soldering or welding the side seams.

Another object is the provision of a method of the character described which provides for first defining side seam areas in a blank by coating portions of a surface of the blank and leaving parts of the surface uncovered, thereupon lithographing or otherwise printing a label design on the blank and over the coated surface still leaving uncoated the uncoated area, deoxidizing such uncoated sections and forming the prepared blank as a can body having a side seam which is thereupon soldered or welded.

A still further object is the provision of such a method which includes flowing a liquid deoxidization agent over defined side seam parts of the can body blank and then washing and drying such deoxidized sections preparatory to forming the blank into a can body having a soldered or welded side seam.

Numerous other objects and advantages of the invention will be apparent as it is better understood from the following description, which, taken in connection with the accompanying drawings, discloses a preferred embodiment thereof.

Referring to the drawings:

Figure 1 is a plan view of a sheet of black plate embodying the present invention showing the covering of parts of one surface with a coating material so disposed on the surface as to define and leave uncoated side seam sections;

Fig. 2 is a similar view showing the surface further treated as by superimposing a lithographed label over the coated sections;

Fig. 3 is a similar view of the opposite side of the sheet showing the surface partly covered with a coating material leaving uncoated side seam sections;

Fig. 4 is a plan view of a part of the sheet of Fig. 2 illustrating severing of the same to provide a strip of can body blanks;

Figs. 5 and 6 are plan views of a single blank cut from the strip of Fig. 4, these two views showing different sides of the blank after deoxidization of the side seam sections;

Fig. 7 is a perspective view on a larger scale of a formed can body having a side seam as formed from the blanks of Figs. 5 and 6;

Fig. 8 is a schematic sectional elevation of some of the parts of a coating machine or lithographic press for exemplifying coating and also lithographing steps of the present invention;

Fig. 9 is a schematic side elevation of a drying oven shown for the purpose of exemplifying the step of drying a coated or lithographed surface in a sheet;

Fig. 10 is a schematic view of slitter rollers for dividing a sheet of black plate into can body blanks;

Fig. 11 is a schematic perspective view of spray nozzles shown as directing a liquid against the defined side seam edges of the blank and exemplifying either the application of a deoxidizing agent or the washing off of such an agent;

Fig. 12 is a perspective view of heating elements for drying the deoxidized surfaces of a blank, the view showing the blank in drying position; and Fig. 13 is a schematic view in side elevation of a typical cam bodymaker and side seam soldering machine.

The drawings illustrate various stages of manufacture of black plate parts to provide finally a can body having a side seam and some of the views show apparatus for carrying out certain steps of the method. Such can body side seams may be either soldered or welded.

The drawings necessarily are somewhat schematic and reference should now be had to Fig. 1 which discloses a sheet A of black plate. The first step in the treatment according to the present invention is coating parts of one surface of the sheet with a rust and heat resistant substance. This coated area is shown by stippling in this figure and the letter B designates such a coating.

Rust and heat resistant surfaces B are imposed upon the sheet in such a manner as to leave uncoated, strips C and D. The drawings illustrate two inside wide strips C and two narrow marginal strips D. The purpose of this difference in width of strips will be explained hereinafter.

In Fig. 8 there are disclosed the principal parts of a coating machine which may be used for applying the three coated surfaces B upon the sheet A of Fig. 1. Such a machine comprises broadly a frame 21 having an applying or coating roller 22 which may be supplied with the proper paint by a series of fountain rollers 23 operating in conjunction with a supply trough 24. The roller 22 applies the paint to the surface of a printing roller 25.

The printing roller 25 may be cut away for such a design or pattern as shown in Fig. 1 so that paint is received on the surface of the roller only as desired for the pattern to be applied to the sheet. In other words, such a roller may be grooved out or relieved of printing surfaces to correspond with the desired uncoated sections C and D of the sheet A. The numeral 26 designates a backing-up or feed roller located below the printing roller for propelling the sheet A through the printing operation. The printed sheet may be properly discharged from the machine upon a conveyor belt 27.

The coating B which is applied to the surface of the sheet A and which is a rust and heat resisting substance is preferably a metallic paint which will withstand considerable heat without scorching or burning. There are several forms of metallic paint which may be used for this purpose, an aluminum paint being suggested as exemplary of this form of coating.

The conveyor belt 27 of Fig. 8 may lead directly through a drying oven, shown schematically in Fig. 9. Such an oven comprises a casing 31 enclosing a chamber through which the conveyor passes. A hood 32 constitutes the top of the oven and a vent pipe 33 extending up from the top provides for drawing off the fumes and gases of the drying coating as well as products of combustion of the heating elements. Heater pipes 34 may be used as gas supply pipes in which may be arranged, suitable burners 35 located in the oven so that the heating flames may impinge upon the coated surface of the sheet as it passes beneath.

Fig. 2 illustrates a second step in the printing or coating of the sheet A. For this step a coating or lithographing machine such as is disclosed in Fig. 8 may be used and at this time a series of label patterns E may be superimposed upon the dried printed surfaces B of the sheet A. It is desirable that each of these lithographed patterns be smaller than each coated surface B so that marginal edges F of the metallic paint will extend beyond the boundary of each label design.

After printing such label designs, the sheet may be dried by passing it through a suitable drying oven, such as that disclosed in Fig. 9. The lithographed label pattern will be a regular can design such as is desired for the particular contents of the can which will finally be made from the sheet and such a design usually carries a plurality of colors. The usual lithographing or printing methods therefore will be used for the purpose of obtaining the desired proper color scheme.

Usually such lithographed or printed labels are not heat resistant and will not stand the heat of molten solder (such as will be used where the side seam of the can is soldered) without scorching or burning. Leaving the marginal edges F of the heat resisting metallic paint so that the latter extends beyond the lithographed designs E provides protection against scorching or burning of the designs since it is the margins F that will come in contact with the molten solder during the soldering operation. This will be further explained in the subsequent description of the soldering step.

The black plate A when used in a can for holding some materials such as lye, need not be coated on the inside but ordinarily it is desirable to provide an inside lining for the can. Fig. 3 illustrates such a lining pattern which is designated by the letter G. It will be observed that this coat or lining is applied over only portions of the surface of the sheet so that uncoated surfaces are left in between and along the edges of the coated surface. The curved edge pattern of the coating G as shown in Fig. 3, is designated to accommodate the soldering of the seam at its lap sections at each end of the intermediate hook section and at opposite ends of the tubular can body blank.

In this embodiment or pattern there are disclosed two wide strips H and two narrow marginal strips I. The strips I are directly opposite to the uncoated strips D (Fig. 1) on the opposite surface of the sheet and the strips H are correspondingly opposite to the uncoated strips C of the sheet. Applying the inside coating G on the sheet may be done in a regular coating or printing operation and again may be carried out as in the machine of Fig. 8 already described.

After coating this inside surface coat is properly dried by passage of the sheet through a suitable drying oven, such as disclosed in Fig. 9 and already described. The coating applied to the inside of the sheet A as at G (Fig. 3) is usually a suitable lacquer or enamel, the exact material depending entirely upon the contents which is to go into the can finally formed. Since this surface is on the inside, solder will not be directly applied to the surface and it therefore need not be heat resistant. However, for some materials it will be satisfactory to apply the same metallic coating to the inside surface as has already been described for the coating B on the outside.

After the sheet has been properly printed it is next divided into strips J (Fig. 4). This is done usually by passing the sheet through a series of slitter rollers 35, 36 (Fig. 10) which action divides the sheet lengthwise. In the embodiment shown in Fig. 4 each strip then contains three can body blanks.

Individual blanks K (Figs. 5 and 6) may next be obtained from the strip J by cutting across between the blanks midway of the wide uncoated sections C. By referring to Fig. 5 showing the outer surface of the blank, it will thus be apparent that in this separating action the blank on its outside carries the label design E, the edges of which expose the metallic paint B as a boundary surface. At the ends of the blank are uncoated edges, marked L. It will now be apparent why the strips C (Fig. 1) which are split in the dividing operation, were wider than the strips D. The opposite side of the blank K (Fig. 6) contains the lining coating G and at the ends of the blank are uncoated areas M, now substantially the same size, which result from the uncoated areas H and I.

It will be obvious that where the can being made from the black plate under discussion does not require a lining on the inside the lacquer coating G will be omitted. Furthermore, if there is no superimposed lithographic label E and where the can has only its outer surface of metallic paint, the lithographed step of Fig. 2 will be omitted. In some cases the metallic coating on the surface of the sheet A, which has heretofore been considered as a prime coat for lithographing or as a single coat without lithographing, need not extend over the principal area as disclosed at B, but such metallic coating may be used only as a heat resisting barrier. In such a case it will be put on as a pattern which includes only strips located adjacent the side seam areas which are the uncoated surfaces L of the blank K.

The blank K is next subjected to a deoxidizing step. For this purpose there is disclosed in Fig. 11 a series of nozzles 41 from which a deoxidizing agent may be projected on the uncoated edges L of the blank. For the usual black plate this deoxidizing agent may consist of sulphuric acid ($H_2SO_4$) or hydrochloric acid (HCl). Obviously, the blank could be dipped in the acid instead of being sprayed along the edge as shown in Fig. 11. In any event, it is desirable that the uncoated surfaces L and M on the blank be subjected to the deoxidizing action. Again neither acid nor liquid need be employed but the oxide may be removed mechanically as by brushing, grinding or scraping. Such mechanical cleaning of the sheet and removal of the oxide is still considered to fall within the term "deoxidizing" as used in the present invention.

Where acid is used it is desirable that the same be washed away as a part of the deoxidizing step. This may be done in a machine similar to that shown in Fig. 11 at which time the nozzles 41 may be used to convey water as a spray projected along the uncoated and deoxidized marginal edges of the blank.

After washing off the acid it is desirable that all of the moisture be removed and the surface of the blank completely dried. In Fig. 12 there is schematically illustrated a pair of radiant heat units 45 formed with heat chambers 46 through which the blank K may be passed while its deoxidized edges are subjected to the action of radiant or other heat. Such radiant heat units will be connected with proper heating energy. The drawing illustrates gas pipes 47 leading into each heating unit by means of which gas may be supplied to suitable burners confined within the heating chambers 46.

The blank is now ready to be made into a can body. The operations of forming the blank, notching where notching is desired, bending the edges if the side seam is to be interlocked and bumping such interlocked edges closely together, may all be carried out in the usual form of body making machine so extensively used in can manufacture. If the body side seam is to be further sealed as by soldering or welding such soldering or welding action may be carried on in conventional soldering or welding machines.

Fig. 13 illustrates one such usual form of body maker and is designated broadly by the numeral 50. Such a machine may be mounted on a base 51. In this machine the blanks K are fed from a magazine 52 and are thereupon subjected to the various body making operations. A tubular can body P (Fig. 7) results. Such a body has an interlocked side seam 56.

Where the side seam 56 is to be soldered, for example, the formed can body preferably will be fed directly into a side seam soldering machine, designated generally by the numeral 57 in Fig. 13. Such a machine may be mounted upon the base 51 on which the body maker 50 is mounted. The formed can body is conveyed through the side seam soldering machine by a conveyor 58 and during such passage is first passed over rollers 61 of a flux applying device 62 formed as a part of the side seam soldering machine. Acid flux is thereby applied to the side seam.

The can body with its fluxed seam is next moved through a soldering operation during which time it passes over a solder applying roller 63 rotatably mounted within a solder bath 64. The solder within the bath is maintained in a molten condition by suitable heating elements 65. These elements are herein shown as gas burners connected to a supply pipe 66. After application of the solder the side seam is then wiped in the usual manner, a wiping device 67 being illustrated for this purpose.

This completes the sealing of the side seam 56 of the can body P. Obviously if the side seam is to be welded instead of soldered, the formed body will be properly presented to a welding operation. In either event the side seam of the can body formed from the black plate has been suitably prepared so that it may be properly soldered or welded.

It is thought that the invention and many of its attendant advantages will be understood from the foregoing description, and it will be apparent that various changes may be made in the steps of the process described and their order of accomplishment without departing from the spirit and scope of the invention or sacrificing all of its material advantages, the process hereinbefore described being merely a preferred embodiment thereof.

I claim:

1. The method of manufacturing can bodies having edges united in soldered side seam joints, comprising coating a part of a surface of sheet metal with a deoxidizing acid resisting and soldering heat resistant substance while leaving as uncoated sheet metal marginal portions to be incorporated in the side seam to provide a can body blank, applying a deoxidizing acid to said marginal portions of the blank defined by said coating to remove oxide therefrom up to said coating while confining the deoxidizing action by said coating to said marginal portions, and forming a can body from the blank by soldering together the deoxidized portions in a side seam in the presence of soldering heat.

2. The method of making tubular can bodies from black iron plate, said bodies having soldered side seams, comprising coating the major portion of a surface of said plate with a rust heat and solder resistant metallic paint which is also resistant to an acid deoxidizing agent, while leaving as uncoated black plate marginal portions of the plate surface defined by said metallic paint to be incorporated in the side seam to provide a can body blank with restricted side seam areas, applying a fluid deoxidizing acid to said areas to remove oxide therefrom up to the edges of said coating, while confining the deoxidizing action by said coating to said areas, washing off said acid, forming a tubular can body from said blank with said deoxidized solderable areas incorporated in the side seam, and applying molten solder to said areas to unite the said marginal portions within the side seam, said metallic paint restricting the solder area to a narrow band and also protecting the can body against subsequent deterioration.

3. The method of manufacturing can bodies having edges united in soldered side seam joints, comprising coating intermediate portions of the sheet adjacent opposite marginal edges thereof with a deoxidizing acid resisting and soldering heat resistant substance while leaving as uncoated sheet metal marginal portions to be incorporated in the side seam to provide a can body blank, applying a deoxidizing acid to said marginal portions of the blank defined by said coating to remove oxide therefrom up to said coating while confining the deoxidizing action by said coating to said marginal portions, and forming a can body from the blank by soldering together the deoxidized portions in a side seam in the presence of soldering heat.

DELBERT E. WOBBE.